United States Patent

[11] 3,568,109

[72] Inventor Richard F. Neuens
Silver Spring, Md.
[21] Appl. No. 725,979
[22] Filed May 2, 1968
[45] Patented Mar. 2, 1971
[73] Assignee Allen-Bradley Company
Milwaukee, Wis.

[54] VARIABLE OR LOW PASS FILTER
8 Claims, 10 Drawing Figs.

[52] U.S. Cl. .......... 333/79, 333/70, 317/256
[51] Int. Cl. .......... H03h 5/06
[50] Field of Search .......... 333/79, 70 (S), 70 (R); 317/256; 307/92—94, (Cursory); 330/141—142, (Cursory)

[56] References Cited

UNITED STATES PATENTS

| | | | |
|---|---|---|---|
| 2,126,915 | 8/1938 | Norton | 333/79 |
| 2,163,775 | 6/1939 | Conklin | 333/70(S) |
| 2,259,234 | 10/1941 | Voigt | 317/260X |
| 2,281,571 | 5/1942 | Gage | 333/79X |
| 2,491,681 | 12/1949 | Minter, II | 333/79 |
| 2,521,828 | 9/1950 | Chatterton et al. | 317/256X |
| 2,526,321 | 10/1950 | Beverly | 333/31(C) |
| 2,983,855 | 5/1961 | Schlicke | 333/79X |
| 3,035,237 | 5/1962 | Schlicke | 333/79X |
| 3,129,396 | 4/1964 | Germain et al. | 333/79X |
| 3,243,738 | 3/1966 | Schlicke et al. | 317/242X |
| 3,302,081 | 1/1967 | Grahame | 317/256 |
| 3,329,911 | 7/1967 | Schlicke et al. | 333/79 |
| 3,371,295 | 2/1968 | Bourgault et al. | 317/256X |

OTHER REFERENCES

Rountree, J. G. " A $5 Low-Pass Filter" radio and T.V. news, 6-1953 pp. 47— 48 Frederick, " Handbook on Radio Frequency Interference" Vol. 3, Chapt. 4, Secs. 1.2.4— 1.2.5 pp. 4— 28 4— 34, Frederick Research Corp. Wheaton, Md. TK6553 F68, 1962

Schlicke et al., " Compatible Emi Filters" IEEE Spectrum, Oct. 1967, pp. 59— 68 TK1 I 14

Denes et al., " Tiny Filters Block The Path of Radio Frequency Interference," Interference" Electronics, Oct. 31, 1966 pp. 58— 67

*Primary Examiner*—Herman Karl Saalbach
*Assistant Examiner*—William H. Punter
*Attorneys*—Arthur H. Seidel and Thomas O. Kloehn

ABSTRACT: A low pass filter for insertion between two circuits, such as a power supply and a load circuit, that blocks the passage from one circuit to the other of radio frequencies above a given pass band, and which continues to function as a satisfactory filter under the condition of reactive components in the power supply and load circuits being close to resonant values with reactive elements in the filter. The filter comprises a $\pi$ network having a series line extending between the network input and output ends that includes an inductive circuit element, and shunt lines branching from the series line that include capacitive elements with resistance to establish resistance-capacitance elements that introduce circuit losses which reduce the Q of the shunt lines to inhibit resonances that might otherwise impair the filtering function of the device.

PATENTED MAR 2 1971

3,568,109

SHEET 1 OF 4

INVENTOR
RICHARD F. NEUENS

BY Arthur H. Seidel

ATTORNEY

INVENTOR
RICHARD F. NEUENS

BY Arthur H. Seidel

ATTORNEY

INVENTOR
RICHARD F. NEUENS

BY Arthur H. Seidel

ATTORNEY

INVENTOR
RICHARD F. NEUENS

BY Arthur H. Seidel

ATTORNEY

VARIABLE OR LOW PASS FILTER

BACKGROUND OF THE INVENTION

One principal application of filter circuits is for insertion between a power supply and a load circuit to block unwanted radio frequency interference, such as electromagnetically induced voltages, from entering the load circuit. These filters pass the lower frequencies, or direct current, of the power supply, and they usually comprise one or more inductive circuit elements in a series line extending from the input end to the output end of the filter and capacitive circuit elements in shunt lines of the filter. The practice is to use capacitive and inductive elements that give large valves of Q and little internal power loss to obtain an efficient transmission of the lower frequencies, but to present a high attenuation, as seen at the load, for the higher frequencies to be blocked with only minimal power loss within the filter itself.

It has been the practice in the design of low pass filters to prescribe performance characteristics that are obtained when connected between specific power supply and load circuit impedances. A 50 ohm resistance is frequently selected as a standard value for both the power supply and the load circuit, and low pass filters are then designed to provide specified performance curves when inserted between such 50 ohm resistance circuits. In such designing, the characteristic impedance of the filter is made equal, or nearly equal, to the 50 ohm value, and the filter may be said to be matched to the power supply and load circuit impedances. Matching of this nature can be carried out effectively in communication circuits, wherein power sources and loads can be designed with resistive impedances of preselected value. However, low pass filters are also employed between commercial power lines and load circuits having impedances that vary substantially from that for which the filter may be designed, and which impedances have reactive components in addition to resistive values.

Low pass filters for blocking radio frequencies which are designed in the foregoing manner of being tailored for 50 ohm resistance systems frequently fail to perform satisfactorily when connected to circuits for which they are not so matched. Under such conditions, instead of satisfactorily passing frequencies up to the intended cutoff range and then blocking higher frequencies, the filtering function may become erratic. The filter may introduce a substantial insertion loss for frequencies that should be passed, and at frequencies that are to be blocked the insertion loss may drop far below prescribed limits, and at times even become negative, whereby the presence of the filter is worse than having no filter in the circuit.

A situation in which these poor impedance conditions between a filter and the circuits to which it is connected will occur when the filter is connected between a commercial power supply and an electrical apparatus fed by such supply. The impedance of the commercial power supply will vary as other power consumers switch their equipment on and off the power lines. Not only is there a mismatch of impedance, but the mismatch will be a changing one. Whenever the reactance of the power supply is equal in value, but opposite in angle to that of the reactance seen looking into the filter resonance may occur, and it is for such resonance that the worst condition takes place. For a worst case condition that occurs at frequencies above the pass band of the filter the filtering properties will become seriously impaired, and possibly lost altogether, so that the filter actually passes the undesirable radio frequencies. Thus, the design of a filter for satisfactory performance in a 50 ohm system is not an adequate design for installations where other impedances are encountered. This problem of providing a filter satisfactory for use with a wide variation in power supply and load impedances has not heretofore been satisfactorily solved to my knowledge.

SUMMARY OF THE INVENTION

In the present invention there is provided a low pass filter in which shunt lines of the filter include capacitance and resistance to provide a lossy current path of low Q value to eliminate resonant conditions between reactance within the filter and reactance of an external circuit connected to the filter.

The difficulties in the use of prior low pass filters with power supply or load circuits of impedances varying from the specific impedances for which the filters are designed is due to the interaction of the shunt elements of the filters, which are nearly pure capacitance, with inductive reactances of the external circuits to which they are connected. These reactances may approach, and reach resonant conditions, and when this condition is severe the insertion loss that a filter is to present may decrease so that the filtering function is lost. In the present invention a filter is provided that will function properly for most any external impedances between which it may be connected. To achieve this end, a lossy resistance component is inserted in shunt lines of the filter, preferably as a distributed resistance within a capacitive element. This distributed resistance-capacitance simulates a portion of a lossy line, and will function to satisfactorily shunt the high frequencies above the filter cutoff frequency without incurring undesirable resonance with external circuits. As a result, filtering performance may be maintained at otherwise critical values of filter and external circuit impedances.

One characteristic of a lossy resistance-capacitance shunt line for a filter is that the Q of the line may decrease with increasing frequency and remain at a small value. The dissipative character of the shunt line then eliminates unwanted resonant conditions, and at the same time the inductance and capacitance of the filter continue to pass frequencies below cutoff and to block frequencies in the stop band.

Objects of the invention are to provide a low pass filter useful with external impedances of any value, so as to be compatible with impedances other than just 50 ohm resistances; to provide a filter with a lossy, low Q shunt line that will not resonate with external impedances; to provide a filter in which a distributed capacitance-resistance element has operating characteristics that are not seriously impaired by external impedances; and, in general, to provide a more versatile low pass filter useful in many different circuit applications. Other objects and advantages will become apparent from the following description, and reference is made to the claims for the scope of the invention.

THE DRAWINGS

EMBODIMENTS OF THE INVENTION

Figures 1, 2:
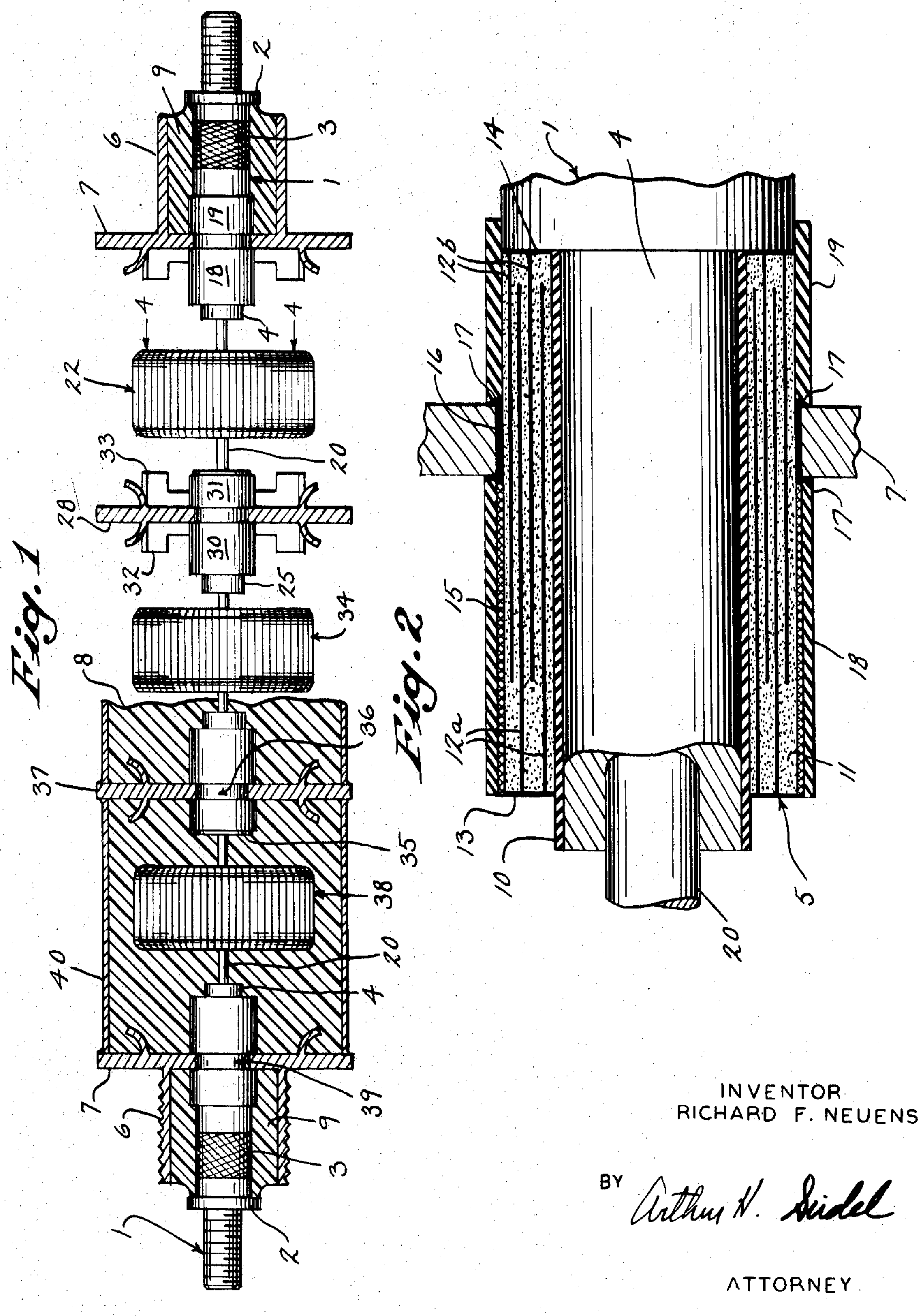
FIG. 1 is a side view in section with parts broken away of a low pass filter embodying the invention.
FIG. 2 is a view in section on an enlarged scale of a portion of the filter of FIG. 1 that comprises a capacitive element and adjoining parts which are located at the right-hand end of FIG. 1.

Referring to the drawings, there is shown in FIG. 1 a view in section of a low pass filter that has been designed for a rating of 100 volts DC 10 amperes. The overall configuration of the filter is generally cylindrical with threaded metal terminals 1 extending from each end. Each terminal 1 has a collar 2 adjacent its exposed threaded end, and this is succeeded by a knurled part 3 and then a inner end 4. The end 4 of the right-hand terminal 1 is shown on an enlarged scale in FIG. 2, and it is seen that it is of reduced diameter to mount a capacitive element 5.

Each terminal 1 is disposed within a cup-shaped end cap 6 that includes a circular end wall 7. The inner face of each end wall 7 has an inwardly projecting anchor ring with bent ears that functions to anchor the end cap 6 with an embedding resin 8 that forms a solid body that encapsulates the interior elements of the filter. The resin 8 has been removed from the right-hand side of FIG. 1 for the sake of clarity of the interior construction. A second resin filler 9 of insulating quality fills the annular spaces between each terminal 1 and its associated end cap 6, to provide rigidity for the terminals and to maintain spacing between them and the walls of the end caps 6. The left-hand end cap 6 is also threaded, to provide a means of mounting the filter unit.

Referring to FIG. 2 for a description of the capacitive element 5 and its mounting, there is shown a thin insulating sleeve 10 tightly surrounding the inner end 4 of the terminal 1. This sleeve can be of plastic tubing heat shrunk to form the tight fit, and over this sleeve 10 is placed the cylindrical capacitive element 5. The element 5 is formed of thin tubular layers of a ceramic dielectric 11 interleaved with tubular conductive electrodes 12*a* and 12*b*, and it can be constructed by dipping and spraying techniques that provide the thinness desired. For a wall thickness of 0.0425 inch for the element 5 13 electrode layers is a representative construction, although only four layers are shown in FIG. 2 for purposes of illustration. The material for the electrodes 12*a* and 12*b* is of minimal resistance, such as a paladium-gold or platinum paint, and the electrodes 12*a* extend to the left-hand edge of the element 5 to merge with a conductive end layer 13, and the electrodes 12*b* extend to the right edge of the element 5 to merge with an opposite conductive end layer 14. The electrode layers 12*a* alternate with the electrode layers 12*b*, so as to have capacitor electrodes interleaved in the usual fashion, and the end layers 13, 14 may be of a low resistance material such as a silver paste.

Formed as a part of the capacitive element 5 is a thin, conductive outer electrode layer 15 of a resistance material such as nickel. It is in capacitive relation to the outermost electrode layer 12*b*, so that the capacitor portion formed by these two electrodes presents a distributed capacitance and resistance. One end of the layer 15 is electrically joined to the end layer 13, and the other end of this layer 15 merges with a silver terminal band 16. The entire element 5 is fired, or otherwise treated after its layer construction is built up, so as to have a unitary element with the conductive portions in intimate physical engagement with the dielectric material 11. Typical electrical values for a completed capacitive element 5 are a capacitance of one microfarad and a resistance due to the outer electrode layer 15 of 1 ohm. The overall physical dimensions of such an element 5 are length of 0.450 inch and an outside diameter of 0.275 inch. The capacitance and resistance may, of course, vary and a range for the capacitance may be from about 0.5 to 2.0 microfarads. A range for the resistance may be from 1 to 5 ohms.

FIG. 2 shows the conductive end layer 14 butted against a ridge of the terminal 1, so that each electrode 12*b* is connected electrically to a series line extending through the filter, of which the terminal 1 is a part. FIG. 2 also shows the end wall 7 of the end cap 6 fitting about the terminal band 16 with fillets 17 of a silver bearing epoxy resin providing an electrical junction. Thus, the electrodes 12*a* are connected through the distributed resistance electrode 15 to the end cap 6 which, as will be described, is a part of a shielding enclosure that is normally grounded. Thus, the current path through the capacitive element 5 is a shunt line extending from the series line to ground. To complete the structure shown in FIG. 2, a pair of thin insulating sheaths 18 and 19, similar to the sleeve 10, are wrapped tightly around the outside of the capacitive element 5, one being on each side of the end wall 7.

Figures 4, 5:
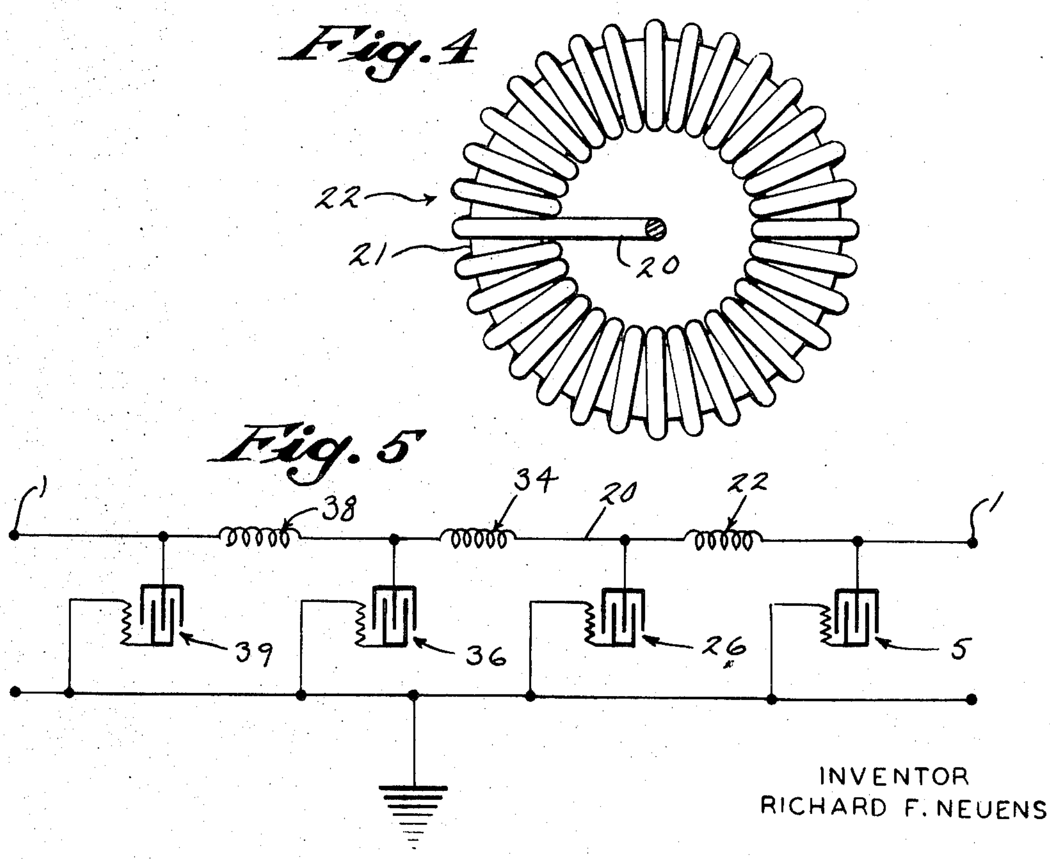
FIG. 4 is a view on another enlarged scale of a ring-type inductive element of the filter that is viewed through the plane 4—4 depicted in FIG. 1.
FIG. 5 is a schematic circuit diagram of the filter of FIG. 1.

Referring back to FIG. 1, a conductor wire 20 is inserted in and electrically connected to the right-hand terminal 1, and it is wound about a ring 21 of insulating material, shown in FIG. 4, to form an inductive element 22. The conductor wire 20 comprises a series line through the filter, of which the element 22 is a part, and a representative value of inductance for this element is 30 microhenry. The inductance may vary, and a range of about 20 to 50 microhenry is an example of such variance.

Figure 3:
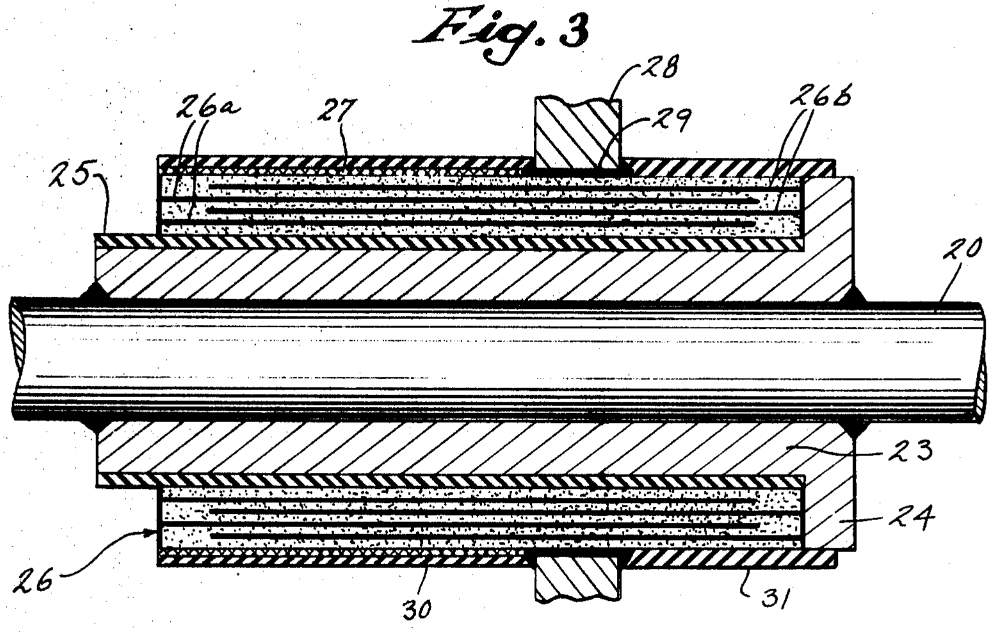
FIG. 3 is a view in section on an enlarged scale of another portion of the filter of FIG. 1 that comprises another capacitive element and adjoining parts, which in FIG. 1 are disposed to the left of the capacitive element of FIG. 2.

The wire 20 extends from the inductive element 22 to a center eyelet 23, shown on a enlarged scale in FIG. 3, with which it is electrically connected. The eyelet 23 has a flange 24 at its right-hand end, and an insulating sleeve 25, similar to the sleeve 10, encircles the shank of the eyelet 23. A second capacitive element 26 is placed over the sleeve 10, which is constructed in a similar manner as the capacitive element 5, with a set of low resistance electrodes 26*b* in electrical engagement with the eyelet flange 24, and hence with the conductor wire 20, and a second set of low resistance electrodes 26*a* in connection with an outer resistance containing electrode 27. A center washer 28 surrounds the capacitive element 26, and is electrically connected to a terminal band 29 that is like the terminal band 16 of the capacitive element 5. To complete the structure of FIG. 3, a pair of protective insulating sheaths 30 and 31 surround the capacitive element 26.

As seen in FIG. 1, the center washer 28 is of the same diameter as the end wall 7 of the end cap 6, and it has anchor rings 32, 33 on each of its faces to provide for an interlocked union with encapsulating resin 8. From the center eyelet 23 the conductor wire 20 extends to and forms another inductive element 34, similar to the element 22. The conductor wire 20 then leads to a combination of center eyelet 35, capacitive element 36 and center washer 37, which combination is a mirror image of the element 26, eyelet 23 and center washer 28. The conductor wire 20 is then formed into another inductive element 38, from which it connects with the left-hand terminal 1. The left-hand terminal 1 mounts a capacitive element 39 that is a mirror image of the element 5 shown in FIG. 2.

Filling the spaces between the center washers 28 and 37 and the end caps 6 is the body resin 8, such as an epoxy, which is cast after assembly of the interior parts described in the foregoing paragraphs. This forms a solid, physically strong body for the filter, and deposited upon the outer cylindrical surface of the resin 8 is an thin metallic coating 40. This coating electrically joins the center washers 28, 37 and the end walls 7 with one another to provide an electrically shielded enclosure which is grounded when the filter is mounted. Further, the center washers 28, 37 and end walls 7 provide a separate, individual shielding for each of the inductive elements 22, 34 and 38.

FIG. 5 represents the electrical circuit of the filter of FIGS. 1—4, and reference numerals have been applied to parts that correspond to those in FIGS. 1—4. The filter comprises three cascaded $\pi$-type connections in which the conductor wire 20 forms a series line extending between the input and output ends of the filter and incorporates three distinct inductive circuit elements 22, 34 and 38. Each of the capacitive elements 5, 26, 36 and 39 forms a shunt line branching from the series line 20 to the grounded side of the filter. Each shunt line also includes a resistance within the capacitive element to provide a distributed capacitance and resistance that creates a lossy current path simulating a section of resistance-capacitance line. This will be described more fully hereinafter.

Figure 6:
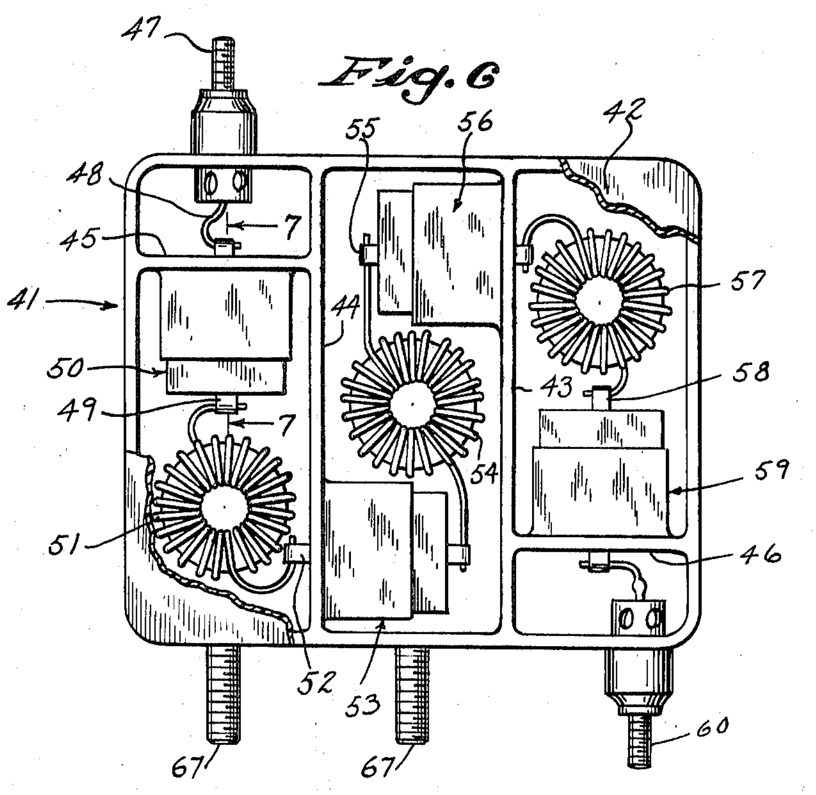
FIG. 6 is a top view of a second embodiment of the invention which comprises a filter in a rectangular housing, portions of the filter being broken away to disclose interior construction.
Figure 7:
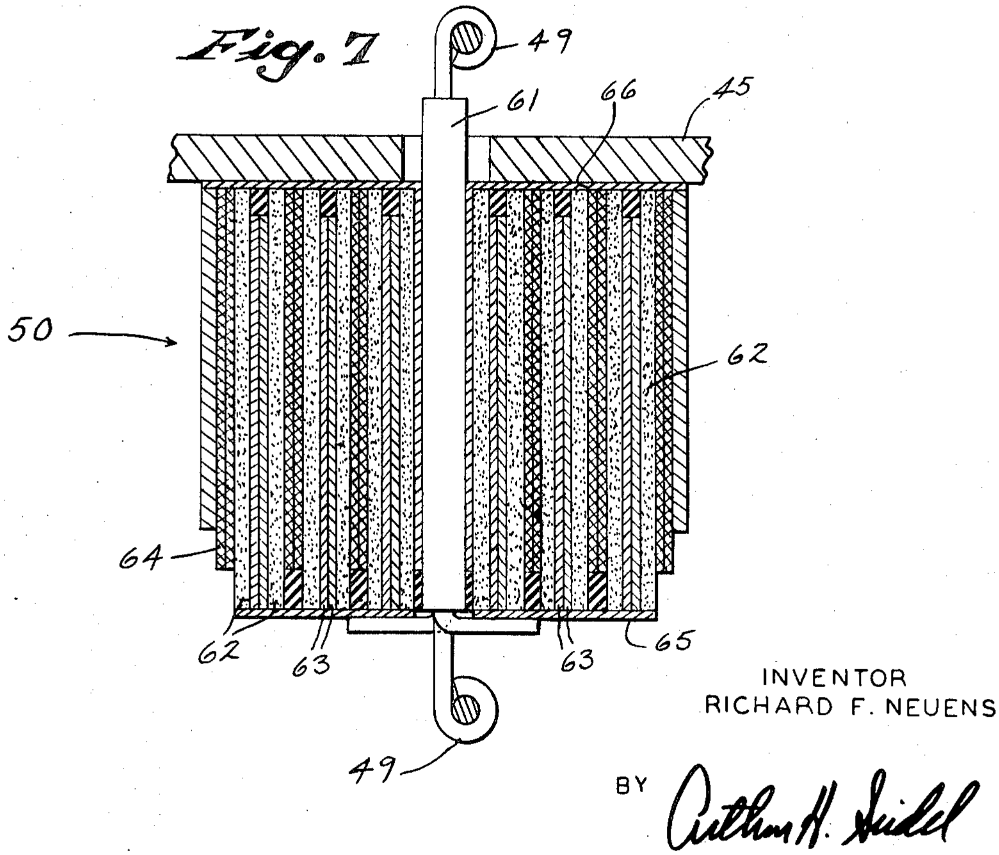
FIG. 7 is a view in section on an enlarged scale of one of the capacitive elements forming a part of the filter of FIG. 6.
Figure 8:
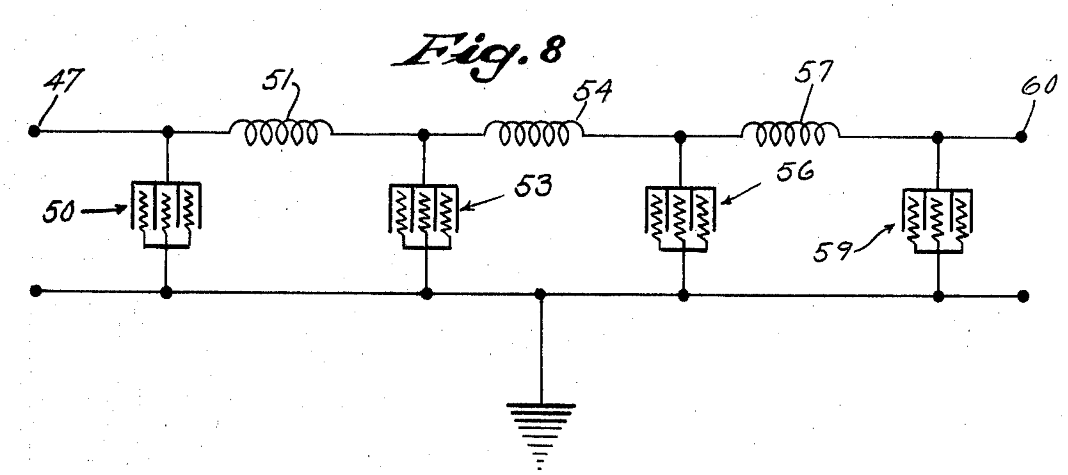
FIG. 8 is a schematic circuit diagram of the filter of FIG. 6.

Referring now to FIGS. 6—8, there is shown a second embodiment of the invention that has been designed to conduct AC current through its series line, and a rating of 220 volts AC 10 amperes is representative of the embodiment. The filter of this second embodiment has a rectangular case made up of a compartmented frame 41 with covers 42, broken away to reveal the interior, enclosing each side of the frame 41. The frame 41 and side covers 42 may be metal with shielding properties, or these parts may be of a synthetic material coated with a thin layer of metal that provides adequate shielding. The frame 41 has a number of partitions 43, 44, 45 and 46 which subdivide the interior into individual, shielded compartments. At the upper left there is an input terminal 47 that connects with an internal wire 48. This wire 48 is, in turn, connected to one end of a feed-through lead 49 of flat stock that extends directly through and emerges from both ends of a capacitive element 50. The opposite end of the lead 49 is connected to an inductive element 51, which is joined at its opposite end to a feed-through lead 52 of a second capacitive element 53. The lead 52 extends through the capacitive element 53 and then connects with a second inductive element 54. The connections continue in like manner through the filter; a feed-through lead 55 of a third capacitive element 56, a third inductive element 57, a feed-through lead 58 of a fourth capacitive element 59, and an end terminal 60 similar to the terminal 45 making up the remaining components.

The capacitive element 50 is shown in FIG. 7, and it is representative of the other elements 53, 56 and 59. The lead 49 is enclosed in an insulating sheath 61, and on each side of the lead 49 is a stack of dielectric and electrode layers that make up the active part of the element 50. There are a number of flat, ceramic, dielectric plates 62. On one side of each plate 62 is a low resistance electrode 63 of a silver paste or similar material, and on the opposite side of each plate 62 is an electrode 64 having electrical resistance. A cermet may be used as a suitable material for the resistive electrodes 64.

The dielectric plates 62 are stacked with resistive electrode 64 against resistive electrode 64 and low resistance electrode 63 against low resistance electrode 63. All the low resistance electrodes 63 extend to the bottom of the element 50, and are joined by a silver paste end layer 65 to the feed-through lead 49. All the resistive electrodes 64 extend to the top of the element 50, and are joined by an end layer 66 to the partition 45, hence all the resistive electrodes 64 are connected to the enclosure which will normally be grounded. And, as seen in FIG. 6 there are a pair of mounting studs 67 for grounding the enclosure.

The circuit for the filter of FIGS. 6 and 7 is shown in FIG. 8. It is similar to that of the first embodiment, except that the distributed resistance in the capacitive elements extends through the entire interface of the electrodes. Hence, there is a more pronounced distribution of a lossy characteristic in the capacitive element electrodes than in the instance of the first embodiment. The values of resistance, capacitance and inductance may vary through ranges similar to those described in the embodiment of FIGS. 1—5.

Figure 9:
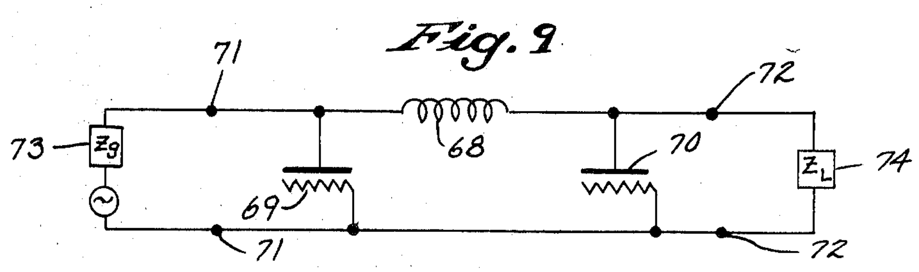
FIG. 9 is a general schematic wiring diagram of the invention.

FIG. 9 is a circuit diagram for the invention showing its embodiment in a single section of a $\pi$ filter, as contrasted to cascaded $\pi$ sections in FIGS. 5 and 8. A series line through the filter of FIG. 9 contains an inductive circuit element 68, the primary function of which is to block the higher frequencies, such blocking effect increasing with frequency. Two shunt lines with capacitive elements 69, 70 branch off the series line, one to each side of the inductance. These shunt lines are across the input terminals 71 and the output terminals 72 of the filter, or they may be described as connected at the interface between the filter and external circuits, such as a generator with a generator impedance 73 and a load having an impedance 74. It is the shunt lines at the interfaces which primarily react with external impedances, such that in ordinary filters these impedances may impair filtering action. Hence, the introduction of the lossy characteristic is of particular importance in the shunt lines at the interfaces between a filter and the external circuits.

Figure 10:
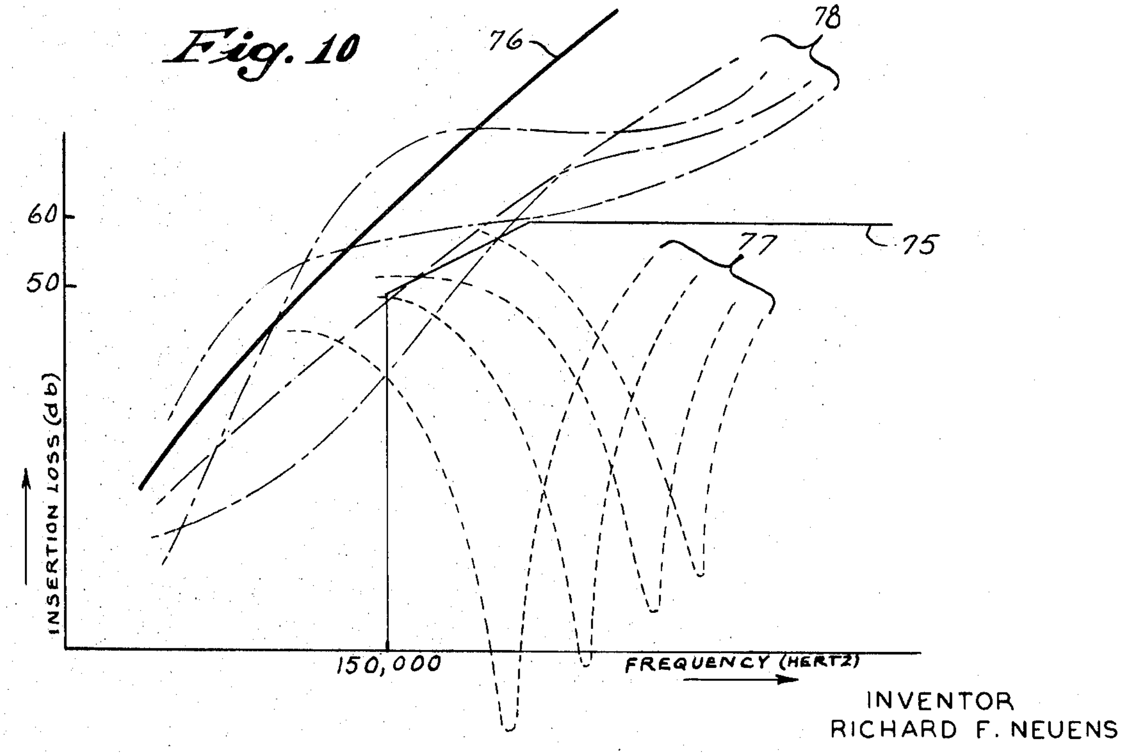
FIG. 10 is a graph showing certain characteristics of the invention.

FIG. 10 is a graph depicting filtering performance of a filter incorporating the invention and of a filter without the invention. The abscissa is a logarithmic representation of frequency and the ordinate represents the insertion loss of a filter inserted between a generator and a load. The line 75 represents a performance specification for a filter requiring an insertion loss of at least 50 d at 150 kHz. and of at least 60 d at 300 kHz. and greater frequencies. The heavy curve 76 illustrates the performance that can be obtained by both a filter of the invention and of an ordinary filter, not embodying the invention, when connected between a 50 ohm resistance for the generator impedance and a 50 ohm resistance for the load impedance. The ordinary filter, not embodying the invention, is one that is specifically designed for a 50 ohm system, and hence has a good performance curve 76 under the particular condition of use in such a system.

The four dotted curves 77 are for the filter without the invention when connected between a generator and load under the conditions of the generator and load impedances presenting a substantial inductance at the interfaces between the filter and the external circuits. Each curve is for a different external inductance, and the dip in the curve is the worst case condition in which resonance is approached between the external impedance and that impedance seen when looking into the filter, which latter impedance, is, for the frequencies involved, primarily that of the filter shunt line at the interface. It is readily apparent that the function of the filter is severely impaired and that it loses its ability to serve its intended purpose.

The family of four curves 78 are for the filter of the invention when connected into inductively reactive external circuits such as produced the curves 77. The lossy character of the filter shunt lines, particularly the shunt lines at the interfaces with the external circuits, and the low Q of these filter shunt lines have eliminated the resonant conditions and have improved filtering to such an extent that the performance specifications are substantially met even for the worst case conditions.

The lossy shunt lines of a filter of the invention exhibit a Q value that decreases as frequency approaches the cutoff frequency, which in the instance of FIG. 10 is 150 kHz. It is desirable that the Q decrease to about a value of 1 for the cutoff frequency and remain at this level or lower over the stop band of frequencies. A lower Q value, at cutoff frequency, as low as one-half, for example, may be satisfactory, although the capacitance and inductance values may have to be increased to compensate. The value of Q at cutoff frequency may also be larger than 1, for example a value of 2 may be satisfactory. The value of Q may continue to decrease for frequencies above the cutoff frequency. This characteristic being dependent upon the degree of distribution of the resistance in the capacitive element electrodes. For a resistance distributed throughout one electrode of the capacitive element Q will likely remain at about a value of 1.

The novel introduction of capacitance-resistance in the filter shunt lines provides the low Q, and thus a lossy shunt line, that makes the low pass filter of the invention compatible with many external impedance values, including changing external impedances. This novel low Q for a filter circuit is preferably developed by a distributed resistance within a capacitive element to simulate a section of lossy line. Also, the low Q is achieved without excessive resistance losses. The Q decreases in value as cutoff frequency approaches, and then is maintained at a low value. As indicated above, the value of Q at cutoff may vary from about one-half to 2, and when referring herein to a value of approximately 1, the range of variation is meant to encompass such values at which satisfactory performance is maintained. For a preferable embodiment, the value of Q at cutoff should be substantially 1 or less.

There has been described herein a low pass filter of the passive type and the embodiments described are for purposes of illustrating preferred forms of the invention. The invention may be practiced in other variant forms, and the scope of the invention is to be determined from the following claims and as liberal an interpretation as to which they may be entitled.

I claim:

1. In a low pass filter the combination comprising:

terminals at the electrical ends of the filter;

a series line extending between said terminals that includes an inductive circuit element that has an increasing blocking effect with increasing frequency; and a shunt line branching from the series line that includes a capacitive element and a resistance in conjunction with the capacitance wherein in the low pass frequency band Q of the capacitive-resistive shunt line is greater than 1 and decreases to a value of approximately unity and remains below such value for a range of frequencies above a low pass frequency band to inhibit resonance between the filter and circuitry to which it is connected.

2. A low pass filter in accordance with claim 1 in which the Q of the capacitive-resistive shunt lines remains at approximately unity for a range of frequencies above the filter cutoff frequency.

3. A low pass filter in accordance with claim 1 in which the resistance is incorporated within the capacitive element as a part of an electrode.

4. A low pass filter in accordance with claim 3 in which the resistance is distributed over an area of a capacitor electrode to simulate a distributed resistance-capacitance network within the capacitive element.

5. In a low pass filter for use with unmatched external impedances the combination comprising:

a shielded enclosure;

a first terminal;

a second terminal at the opposite end of the filter;

a series line extending between said terminals and including a plurality of inductive circuit elements spaced along the length of the line;

a plurality of shunt lines each branching from the series line to the enclosure, which enclosure provides additional terminal means for the filter, with points of branching between said inductive circuit elements and between the first and second terminals and the respective adjacent inductive circuit elements;

each shunt line including a capacitive element of a high dielectric strength ceramic material interleaved with capacitor electrodes in an intimate contact therewith;

each of the capacitive elements in said shunt lines between a terminal and an inductive circuit element having at least a portion of an electrode on one side of the dielectric incorporating an electrical resistance to establish a distributed RC network having a value for the Q of the shunt line that is reduced to within about one-half to 2 at the cutoff frequency, and that is of a larger value of frequencies to be passed by the filter; and said shielded enclosure providing shielding for each inductive circuit element that compartmentalizes the inductive elements from one another.

6. In a low pass filter for use with unmatched external impedances the combination comprising:

a shielded enclosure;

a first terminal;

a second terminal at the opposite end of the filter;

a series line extending between said terminals and including a plurality of inductive circuit elements spaced along the length of the line;

a plurality of shunt lines each branching from the series line to the enclosure, which enclosure provides additional terminal means for the filter, with points of branching between said inductive circuit elements and between the first and second terminal and the respective adjacent inductive elements;

each shunt line including a capacitive element of a high dielectric strength ceramic material interleaved with capacitor electrodes in intimate contact therewith; and each of the capacitive elements in said shunt lines between a terminal and an inductive circuit element having at least a portion of an electrode on one side of the dielectric incorporating electrical resistance to establish a distributed RC network having a value for the Q of the shunt line that reduced to at least a value of about 2 for frequencies to be blocked by the filter, and that is of a larger value for frequencies to be passed by the filter.

7. In a low pass filter of $\pi$ configuration the combination comprising:

a first pair of terminals;

a second pair of terminals;

a series line extending between one of the first pair of terminals and one of the second pair of terminals which includes an inductive circuit element;

a first shunt line extending between the first pair of terminals that includes a capacitive element;

a second shunt line extending between the second pair of terminals that includes a second capacitive element; and at least one of said shunt lines having a resistance within an electrode of the capacitive element to simulate a distributed resistance-capacitance line, the Q of the resistance-capacitance shunt line being above unity for frequencies to be passed by the filter and decreasing to and remaining at approximately unit for a range of frequencies above the pass band of the filter.

8. A low pass filter in accordance with claim 7 in which the filter provides an insertion loss of 50 db at 150 kHz. and frequencies in excess thereof when connected between external impedances having substantial reactance.